(12) United States Patent
Turtinen et al.

(10) Patent No.: US 11,770,857 B2
(45) Date of Patent: Sep. 26, 2023

(54) METHODS AND APPARATUSES FOR RANDOM ACCESS PROCEDURE

(71) Applicant: Nokia Technologies Oy, Espoo (FI)

(72) Inventors: Samuli Turtinen, Ii (FI); Chunli Wu, Beijing (CN); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/911,306

(22) Filed: Jun. 24, 2020

(65) Prior Publication Data

US 2021/0360700 A1    Nov. 18, 2021

(30) Foreign Application Priority Data

May 18, 2020   (WO) ................ PCT/CN2020/090772

(51) Int. Cl.
| | |
|---|---|
| *H04W 74/08* | (2009.01) |
| *H04W 74/02* | (2009.01) |
| *H04W 76/11* | (2018.01) |
| *H04W 76/28* | (2018.01) |
| *H04W 72/23* | (2023.01) |

(52) U.S. Cl.
CPC ....... *H04W 74/0833* (2013.01); *H04W 72/23* (2023.01); *H04W 74/02* (2013.01); *H04W 76/11* (2018.02); *H04W 76/28* (2018.02)

(58) Field of Classification Search
None
See application file for complete search history.

(56) References Cited

U.S. PATENT DOCUMENTS

| | | | | |
|---|---|---|---|---|
| 2009/0316593 | A1* | 12/2009 | Wang ................ | H04W 74/0833 370/252 |
| 2019/0215897 | A1 | 7/2019 | Babaei et al. | |
| 2020/0107371 | A1* | 4/2020 | Kunt ..................... | H04W 76/27 |
| 2020/0245395 | A1* | 7/2020 | Zhang ................... | H04L 5/0053 |
| 2020/0350973 | A1* | 11/2020 | Cirik ...................... | H04W 76/19 |
| 2020/0351955 | A1* | 11/2020 | Jeon ....................... | H04L 5/0092 |

(Continued)

FOREIGN PATENT DOCUMENTS

| | | |
|---|---|---|
| CN | 105122858 A | 12/2015 |
| CN | 109952807 A | 6/2019 |

(Continued)

OTHER PUBLICATIONS

Of Nokia et al. ("On 2-step Random Access Procedure", dated Jan. 2019, 3GPP TSG RAN WG1 Ad-Hoc Meeting 1901, R1-1901192, all pages). (Year: 2019).*

(Continued)

*Primary Examiner* — Srinivasa R Reddivalam
(74) *Attorney, Agent, or Firm* — Joseph C. Drish; Harrington & Smith

(57) ABSTRACT

Disclosed are methods for a random access procedure. An example method may include transmitting a random access request to perform a random access procedure, starting a random access response window, and performing at least one of: being in an active time while the random access response window is running, and starting at least one discontinuous reception timer when receiving a PDCCH transmission addressed to a RNTI. Related apparatuses and computer readable media are also disclosed.

27 Claims, 6 Drawing Sheets

(56) References Cited

U.S. PATENT DOCUMENTS

| | | | |
|---|---|---|---|
| 2020/0374935 A1* | 11/2020 | Bergström | H04W 80/08 |
| 2021/0068162 A1* | 3/2021 | Agiwal | H04L 41/0668 |
| 2021/0282187 A1* | 9/2021 | Agiwal | H04W 72/1289 |
| 2021/0352759 A1* | 11/2021 | Bergström | H04W 76/27 |
| 2022/0256620 A1* | 8/2022 | Lu | H04W 74/0866 |

FOREIGN PATENT DOCUMENTS

| | | |
|---|---|---|
| WO | WO-2019135654 A1 | 7/2019 |
| WO | 2020/055102 A1 | 3/2020 |
| WO | WO-2020083182 A1 | 4/2020 |

OTHER PUBLICATIONS

International Search Report and Written Opinion received for corresponding Patent Cooperation Treaty Application No. PCT/CN2020/090772, dated Feb. 20, 2021, 10 pages.

"Corrections to DRX and RA Procedure", 3GPP TSG-RAN WG2 Meeting #77, R2-120362, ASUSTeK, Feb. 6-10, 2012, 6 pages.

"Revised work item proposal: 2-step RACH for NR", 3GPP TSG RAN Meeting #83, RP-190711, Agenda : 9.4.7, ZTE Corporation, Mar. 18-21, 2019, 4 pages.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; NR;Medium Access Control (MAC) protocol specification (Release 16)", 3GPP TS 38.321, V16.0.0, Mar. 2020, pp. 1-141.

"3rd Generation Partnership Project; Technical Specification Group Radio Access Network; NR; Physical layer procedures for control (Release 16)", 3GPP TS 38.213, V16.1.0, Mar. 2020, pp. 1-156.

"3rd Generation Partnership Project; Technical Specification Group Radio Access Network; NR; Radio Resource Control (RRC) protocol specification (Release 15)", 3GPP TS 38.331, V15.9.0, Mar. 2020, pp. 1-536.

Sharp: "Extension of DRX Active Time" 3GPP Draft; R2-1900852, $3^{rd}$ Generation Partnership Project (3GPP), Mobile Competence Centre; 650, Route Des Lucioles; F-06921 Sophia-Antipolis Cedex; France Feb. 25, 2019-Mar. 1, 2019 Feb. 14, 2019, XP051602224.

* cited by examiner

METHODS AND APPARATUSES FOR RANDOM ACCESS PROCEDURE

RELATED APPLICATION

This application claims priority from PCT Application No.: PCT/CN2020/090772 filed on May 18, 2020, which is hereby incorporated in its entirety.

TECHNICAL FIELD

Various example embodiments relate to methods and apparatuses for a random access procedure.

BACKGROUND

For example, in a communication system such as a Long Term Evolution (LTE) system or a New Radio (NR or 5G) system, a user equipment (UE) may perform a random access (RA) procedure with a base station (e.g. an eNB in the LTE system or a gNB in the NR system) in response to a number of events. When discontinuous reception (DRX) is configured, the UE may monitor the physical downlink control channel (PDCCH) in Active Time.

SUMMARY

In a first aspect, a method is disclosed. The method may be performed at an apparatus (e.g. at least a part of a UE), and may include transmitting a RA request to another apparatus (e.g. at least a part of a base station) to perform a RA procedure, and starting a RA response window in response to transmitting the RA request. Further, at least one operation may be performed in the method. In various embodiments, such at least one operation may include at least one of, for example, considering or causing the apparatus to be in an active time while the RA response window is running, starting at least one DRX timer in a case of receiving a PDCCH transmission addressed to a Radio Network Temporary identifier (RNTI) while the RA response window is running, considering or causing the apparatus to be in an active time in response to a successful reception of a message B (or MSGB) scheduled by MSGB Radio Network Temporary Identifier (MSGB-RNTI) which includes fallbackRAR completing the RA procedure after transmitting a contention free message A, and so on.

In various embodiments, the RA request may include a message A (or MSGA) or a contention free preamble for beam failure recovery (BFR).

In various embodiments, the RA request may be a contention based RA request or a contention free RA request.

In various embodiments, the RA response window may include a message B response window for a two-step RA procedure or a RA response window for a four-step RA procedure.

In various embodiments, the apparatus may be in a radio resource control connected mode.

In various embodiments, the RA procedure may include a two-step RA procedure or a four-step RA procedure.

In various embodiments, the at least one DRX timer may include at least one of a DRX inactivity timer, a DRX hybrid automatic repeat request (HARQ) round trip time (RTT) timer uplink, a DRX HARQ RTT timer downlink, a DRX retransmission timer uplink, and a DRX retransmission timer downlink.

In various embodiments, the apparatus may be configured with DRX cycle.

In various embodiments, the method may further include causing the apparatus to enter DRX in response to an expiry of the RA response window.

In various embodiments, the method may further include monitoring the PDCCH addressed to at least one of a Cell Radio Network Temporary Identifier (C-RNTI), a Random Access Radio Network Temporary Identifier (RA-RNTI), and a MSGB-RNTI while the RA response window is running.

In various embodiments, the RNTI may include at least one of C-RNTI, RA-RNTI, and MSGB-RNTI.

In a second aspect, a method is disclosed. The method may be performed at an apparatus (e.g. at least a part of a UE), and may include transmitting a RA request to another apparatus (e.g. at least a part of a base station) to perform a RA procedure, receiving a RA response from the another apparatus, monitoring a PDCCH in an active time, and stopping the active time before receiving a PDCCH transmission addressed to a RNTI.

In various embodiments, the active time may be stopped in response to an expiry of a DRX on duration timer before receiving the PDCCH transmission addressed to the RNTI.

In various embodiments, the monitoring the PDCCH in the active time may include monitoring the PDCCH addressed to at least one of a C-RNTI, a RA-RNTI, and a MSGB-RNTI in the active time.

In various embodiments, the RNTI may include at least one of C-RNTI, RA-RNTI, and MSGB-RNTI.

In a third aspect, a method is disclosed. The method may be performed at an apparatus (e.g. at least a part of a base station), and may include receiving a RA request from another apparatus (e.g. at least a part of a UE) to perform a RA procedure, transmitting a PDCCH, and making at least one determination including, for example, whether the another apparatus is in an active time according to whether a RA response window for the RA procedure is running, whether at least one DRX timer in the another apparatus has been started based on a successful transmission of the PDCCH addressed to a RNTI while the RA response window is running, whether the another apparatus is in an active time based on a successful reception of a MSGB scheduled by MSGB-RNTI which includes fallbackRAR completing the RA procedure after transmitting a contention free message A, and so on.

In various embodiments, the RA request may include a message A or a contention free preamble for BFR.

In various embodiments, the RA request may be a contention based RA request or a contention free RA request.

In various embodiments, the RA procedure may include a two-step RA procedure or a four-step RA procedure.

In various embodiments, the at least one DRX timer may include at least one of a DRX inactivity timer, a DRX HARQ RTT timer uplink, a DRX HARQ RTT timer downlink, a DRX retransmission timer uplink, and a DRX retransmission timer downlink.

In various embodiments, the method may further include determining that the another apparatus enters DRX in response to an expiry of the RA response window.

In various embodiments, the transmitting the PDCCH may include transmitting the PDCCH addressed to at least one of a C-RNTI, a RA-RNTI, and a MSGB-RNTI while the RA response window is running.

In various embodiments, the RNTI may include at least one of C-RNTI, RA-RNTI, and MSGB-RNTI.

In a fourth aspect, a method is a method is disclosed. The method may be performed at an apparatus (e.g. at least a part of a base station), and may include receiving a RA request from another apparatus (e.g. at least a part of a UE) to perform a RA procedure, transmitting a RA response to the another apparatus, and determining whether the another apparatus has stopped an active time for monitoring a PDCCH before a successful PDCCH transmission addressed to a RNTI.

In various embodiments, the active time may be determined to have been stopped in response to an expiry of a DRX on duration timer before the successful PDCCH transmission addressed to the RNTI.

In various embodiments, the active time for monitoring the PDCCH may include the active time for monitoring the PDCCH addressed to at least one of a C-RNTI, a RA-RNTI, and a MSGB-RNTI in the active time.

In various embodiments, the RNTI may include at least one of C-RNTI, RA-RNTI, and MSGB-RNTI.

In a fifth aspect, an apparatus is disclosed. The apparatus may be at least a part of a UE and may include at least one processor and at least one memory. The at least one memory may include computer program code, and the at least one memory and the computer program code may be configured to, with the at least one processor, cause the apparatus to perform the method in the first aspect. In various embodiments, the at least one memory and the computer program code may be configured to, with the at least one processor, cause the apparatus to perform transmitting a RA request to another apparatus (e.g. at least a part of a base station) to perform a RA procedure, and starting a RA response window in response to transmitting the RA request. Further, the at least one memory and the computer program code may be configured to, with the at least one processor, cause the apparatus to further perform at least one operation. In various embodiments, the at least one operation may include at least one of, for example, considering or causing the apparatus to be in an active time while the RA response window is running, starting at least one DRX timer in a case of receiving a PDCCH transmission addressed to a RNTI while the RA response window is running, considering or causing the apparatus to be in an active time in response to a successful reception of a MSGB scheduled by a MSGB-RNTI which includes fallbackRAR completing the RA procedure after transmitting a contention free MSGA, and so on.

In various embodiments, the RA request may include a message A (or MSGA) or a contention free preamble for BFR.

In various embodiments, the RA request may be a contention based RA request or a contention free RA request.

In various embodiments, the RA response window main include a message B (or MSGB) response window for a two-step RA procedure or a RA response window for a four-step RA procedure.

In various embodiments, the apparatus may be in a radio resource control connected mode.

In various embodiments, the RA procedure may include a two-step RA procedure or a four-step RA procedure.

In various embodiments, the at least one DRX timer may include at least one of a DRX inactivity timer, a DRX HARQ RTT timer uplink, a DRX HARQ RTT timer downlink, a DRX retransmission timer uplink, and a DRX retransmission timer downlink. For example, the apparatus may include the at least one DRX timer.

In various embodiments, the apparatus may be configured with DRX cycle.

In various embodiments, the at least one memory and the computer program code may be configured to, with the at least one processor, cause the apparatus to further perform entering DRX in response to an expiry of the RA response window.

In various embodiments, the at least one memory and the computer program code may be configured to, with the at least one processor, cause the apparatus to further perform monitoring the PDCCH addressed to at least one of a C-RNTI, a RA-RNTI, and a MSGB-RNTI while the RA response window is running.

In various embodiments, the RNTI may include at least one of C-RNTI, RA-RNTI, and MSGB-RNTI.

In a sixth aspect, an apparatus is disclosed. The apparatus may be at least a part of a UE, and may include means for performing the method in the first aspect. In various embodiments, the apparatus may include means for transmitting a RA request to another apparatus (e.g. at least a part of a base station) to perform a RA procedure, and means for starting a RA response window in response to transmitting the RA request. Further, the apparatus may include means for causing the apparatus to further perform at least one operation. In various embodiments, the at least one operation may include at least one of, for example, considering or causing the apparatus to be in an active time while the RA response window is running, starting at least one DRX timer in a case of receiving a PDCCH transmission addressed to a RNTI while the RA response window is running, considering or causing the apparatus to be in an active time in response to a successful reception of a MSGB scheduled by a MSGB-RNTI which includes fallbackRAR completing the RA procedure after transmitting a contention free MSGA, and so on.

In various embodiments, the RA request may include a message A (or MSGA) or a contention free preamble for BFR.

In various embodiments, the RA request may be a contention based RA request or a contention free RA request.

In various embodiments, the RA response window main include a message B (or MSGB) response window for a two-step RA procedure or a RA response window for a four-step RA procedure.

In various embodiments, the apparatus may be in a radio resource control connected mode.

In various embodiments, the RA procedure may include a two-step RA procedure or a four-step RA procedure.

In various embodiments, the at least one DRX timer may include at least one of a DRX inactivity timer, a DRX hybrid automatic repeat request (HARQ) round trip time (RTT) timer uplink, a DRX HARQ RTT timer downlink, a DRX retransmission timer uplink, and a DRX retransmission timer downlink. For example, the apparatus may include the at least one DRX timer.

In various embodiments, the apparatus may be configured with DRX cycle.

In various embodiments, the apparatus in the sixth aspect may further include means for causing the apparatus to enter DRX in response to an expiry of the RA response window.

In various embodiments, the apparatus in the sixth aspect may further include means for monitoring the PDCCH addressed to at least one of a C-RNTI, a RA-RNTI, and a MSGB-RNTI while the RA response window is running.

In various embodiments, the RNTI may include at least one of C-RNTI, RA-RNTI, and MSGB-RNTI.

In a seventh aspect, a computer readable medium is disclosed. The computer readable medium may include program instructions for causing an apparatus to perform the method in the first aspect. For example, the apparatus may be at least a part of the apparatus in the fifth aspect and/or the sixth aspect. In various embodiment, the program instructions may be used for causing an apparatus to perform transmitting a RA request to another apparatus (e.g. at least a part of a base station) to perform a RA procedure and starting a RA response window in response to transmitting the RA request. Further, the program instructions may be used for causing the apparatus to further perform at least one operation. In various embodiments, the at least one operation may include at least one of, for example, considering or causing the apparatus to be in an active time while the RA response window is running, starting at least one DRX timer in a case of receiving a PDCCH transmission addressed to a RNTI while the RA response window is running, considering or causing the apparatus to be in an active time in response to a successful reception of a MSGB scheduled by a MSGB-RNTI which includes fallbackRAR completing the RA procedure after transmitting a contention free MSGA, and so on.

In various embodiments, the RA request may include a message A (or MSGA) or a contention free preamble for BFR.

In various embodiments, the RA request may be a contention based RA request or a contention free RA request.

In various embodiments, the RA response window main include a message B (or MSGB) response window for a two-step RA procedure or a RA response window for a four-step RA procedure.

In various embodiments, the apparatus may be in a radio resource control connected mode.

In various embodiments, the RA procedure may include a two-step RA procedure or a four-step RA procedure.

In various embodiments, the at least one DRX timer may include at least one of a DRX inactivity timer, a DRX HARQ RTT timer uplink, a DRX HARQ RTT timer downlink, a DRX retransmission timer uplink, and a DRX retransmission timer downlink. For example, the apparatus may include the at least one DRX timer.

In various embodiments, the apparatus may be configured with DRX cycle.

In various embodiments, the at least one memory and the computer program code may be configured to, with the at least one processor, cause the apparatus to further perform entering DRX in response to an expiry of the RA response window.

In various embodiments, the at least one memory and the computer program code may be configured to, with the at least one processor, cause the apparatus to further perform monitoring the PDCCH addressed to at least one of a C-RNTI, a RA-RNTI, and a MSGB-RNTI while the RA response window is running.

In various embodiments, the RNTI may include at least one of C-RNTI, RA-RNTI, and MSGB-RNTI.

In an eighth aspect, an apparatus is disclosed. The apparatus may be at least a part of a UE, and may include at least one processor and at least one memory. The at least one memory may include computer program code, and the at least one memory and the computer program code may be configured to, with the at least one processor, cause the apparatus to perform the method in the second aspect. In various embodiments, the at least one memory and the computer program code may be configured to, with the at least one processor, cause the apparatus to perform transmitting a RA request to another apparatus (e.g. at least a part of a base station) to perform a RA procedure, receiving a RA response from the another apparatus, monitoring a PDCCH in an active time, and stopping the active time before receiving a PDCCH transmission addressed to a RNTI.

In various embodiments, the active time may be stopped in response to an expiry of a DRX on duration timer before receiving the PDCCH transmission addressed to the RNTI.

In various embodiments, the monitoring the PDCCH in the active time may include monitoring the PDCCH addressed to at least one of a C-RNTI, a RA-RNTI, and a MSGB-RNTI in the active time.

In various embodiments, the RNTI may include at least one of C-RNTI, RA-RNTI, and MSGB-RNTI.

In a ninth aspect, an apparatus is disclosed. The apparatus may be at least a part of a UE and may include means for performing the method in the second aspect. In various embodiments, the apparatus may include means for transmitting a RA request to another apparatus (e.g. at least a part of a base station) to perform a RA procedure, means for receiving a RA response from the another apparatus, means for monitoring a PDCCH in an active time, and means for stopping the active time before receiving a PDCCH transmission addressed to a RNTI.

In various embodiments, the active time may be stopped in response to an expiry of a DRX on duration timer before receiving the PDCCH transmission addressed to the RNTI.

In various embodiments, the monitoring the PDCCH in the active time may include monitoring the PDCCH addressed to at least one of a C-RNTI, a RA-RNTI, and a MSGB-RNTI in the active time.

In various embodiments, the RNTI may include at least one of C-RNTI, RA-RNTI, and MSGB-RNTI.

In a tenth aspect, a computer readable medium is disclosed. The computer readable medium may include program instructions for causing an apparatus to perform the method in the second aspect. For example, the apparatus may be at least a part of the apparatus in the eighth aspect and/or the ninth aspect. In various embodiment, the program instructions may be used for causing an apparatus to perform transmitting a RA request to another apparatus (e.g. at least a part of a base station) to perform a RA procedure, means for receiving a RA response from the another apparatus, means for monitoring a PDCCH in an active time, and means for stopping the active time before receiving a PDCCH transmission addressed to a RNTI.

In various embodiments, the active time may be stopped in response to an expiry of a DRX on duration timer before receiving the PDCCH transmission addressed to the RNTI.

In various embodiments, the monitoring the PDCCH in the active time may include monitoring the PDCCH addressed to at least one of a C-RNTI, a RA-RNTI, and a MSGB-RNTI in the active time.

In various embodiments, the RNTI may include at least one of C-RNTI, RA-RNTI, and MSGB-RNTI.

In an eleventh aspect, an apparatus is disclosed. The apparatus may be at least a part of a base station and may include at least one processor and at least one memory. The at least one memory may include computer program code, and the at least one memory and the computer program code may be configured to, with the at least one processor, cause the apparatus to perform the method in the third aspect. In various embodiments, the at least one memory and the computer program code may be configured to, with the at least one processor, cause the apparatus to perform receiving a RA request from another apparatus (e.g. at least a part of a UE) to perform a RA procedure, transmitting a PDCCH, and making at least one determination including, for example, whether the another apparatus is in an active time according to whether a RA response window for the RA procedure is running, whether at least one DRX timer in the another apparatus has been started based on a successful transmission of the PDCCH addressed to a RNTI while the RA response window is running, whether the another apparatus is in an active time based on a successful reception of a MSGB scheduled by a MSGB-RNTI which includes fallbackRAR completing the RA procedure after transmitting a contention free MSGA, and so on.

In various embodiments, the RA request may include a message A or a contention free preamble for BFR.

In various embodiments, the RA request may be a contention based RA request or a contention free RA request.

In various embodiments, the RA procedure may include a two-step RA procedure or a four-step RA procedure.

In various embodiments, the at least one DRX timer may include at least one of a DRX inactivity timer, a DRX HARQ RTT timer uplink, a DRX HARQ RTT timer downlink, a DRX retransmission timer uplink, and a DRX retransmission timer downlink.

In various embodiments, the at least one memory and the computer program code may be configured to, with the at least one processor, cause the apparatus to further perform determining that the another apparatus enters DRX in response to an expiry of the RA response window.

In various embodiments, the transmitting the PDCCH may include transmitting the PDCCH addressed to at least one of a C-RNTI, a RA-RNTI, and a MSGB-RNTI while the RA response window is running.

In various embodiments, the RNTI may include at least one of C-RNTI, RA-RNTI, and MSGB-RNTI.

In a twelfth aspect, an apparatus is disclosed. The apparatus may be at least a part of a base station, and may include means for performing the method in the third aspect. In various embodiments, the apparatus may include means for receiving a RA request from another apparatus (e.g. at least a part of a UE) to perform a RA procedure, means for transmitting a PDCCH, and means for making at least one determination including, for example, whether the another apparatus is in an active time according to whether a RA response window for the RA procedure is running, whether at least one DRX timer in the another apparatus has been started based on a successful transmission of the PDCCH addressed to a RNTI while the RA response window is running, whether the another apparatus is in an active time based on a successful reception of a MSGB scheduled by a MSGB-RNTI which includes fallbackRAR completing the RA procedure after transmitting a contention free MSGA, and so on.

In various embodiments, the RA request may include a message A or a contention free preamble for BFR.

In various embodiments, the RA request may be a contention based RA request or a contention free RA request.

In various embodiments, the RA procedure may include a two-step RA procedure or a four-step RA procedure.

In various embodiments, the at least one DRX timer may include at least one of a DRX inactivity timer, a DRX HARQ RTT timer uplink, a DRX HARQ RTT timer downlink, a DRX retransmission timer uplink, and a DRX retransmission timer downlink.

In various embodiments, the apparatus may further include means for determining that the another apparatus enters DRX in response to an expiry of the RA response window.

In various embodiments, the transmitting the PDCCH may include transmitting the PDCCH addressed to at least one of a C-RNTI, a RA-RNTI, and a MSGB-RNTI while the RA response window is running.

In various embodiments, the RNTI may include at least one of C-RNTI, RA-RNTI, and MSGB-RNTI.

In a thirteenth aspect, a computer readable medium is disclosed. The computer readable medium may include program instructions for causing an apparatus to perform the method in the third aspect. For example, the apparatus may be at least a part of the apparatus in the eleventh aspect and/or the twelfth aspect. In various embodiment, the program instructions may be used for causing an apparatus to perform receiving a RA request from another apparatus (e.g. at least a part of a UE) to perform a RA procedure, transmitting a PDCCH, and making at least one determination including, for example, whether the another apparatus is in an active time according to whether a RA response window for the RA procedure is running, whether at least one DRX timer in the another apparatus has been started based on a successful transmission of the PDCCH addressed to a RNTI while the RA response window is running, whether the another apparatus is in an active time based on a successful reception of a MSGB scheduled by a MSGB-RNTI which includes fallbackRAR completing the RA procedure after transmitting a contention free MSGA, and so on.

In various embodiments, the RA request may include a message A or a contention free preamble for BFR.

In various embodiments, the RA request may be a contention based RA request or a contention free RA request.

In various embodiments, the RA procedure may include a two-step RA procedure or a four-step RA procedure.

In various embodiments, the at least one DRX timer may include at least one of a DRX inactivity timer, a DRX HARQ RTT timer uplink, a DRX HARQ RTT timer downlink, a DRX retransmission timer uplink, and a DRX retransmission timer downlink.

In various embodiments, the program instructions may be used for causing an apparatus to further perform determining that the another apparatus enters DRX in response to an expiry of the RA response window.

In various embodiments, the transmitting the PDCCH may include transmitting the PDCCH addressed to at least one of a C-RNTI, a RA-RNTI, and a MSGB-RNTI while the RA response window is running.

In various embodiments, the RNTI may include at least one of C-RNTI, RA-RNTI, and MSGB-RNTI.

In a fourteenth aspect, an apparatus is disclosed. The apparatus may be at least a part of a base station, and may include at least one processor and at least one memory. The at least one memory may include computer program code, and the at least one memory and the computer program code may be configured to, with the at least one processor, cause the apparatus to perform the method in the fourth aspect. In various embodiments, the at least one memory and the computer program code may be configured to, with the at least one processor, cause the apparatus to perform receiving a RA request from another apparatus (e.g. at least a part of a UE) to perform a RA procedure, transmitting a RA response to the another apparatus, and determining whether the another apparatus has stopped an active time for monitoring a PDCCH before a successful PDCCH transmission addressed to a RNTI.

In various embodiments, the active time may be determined to have been stopped in response to an expiry of a DRX on duration timer before the successful PDCCH transmission addressed to the RNTI.

In various embodiments, the active time for monitoring the PDCCH may include the active time for monitoring the PDCCH addressed to at least one of a C-RNTI, a RA-RNTI, and a MSGB-RNTI in the active time.

In various embodiments, the RNTI may include at least one of C-RNTI, RA-RNTI, and MSGB-RNTI.

In a fifteenth aspect, an apparatus is disclosed. The apparatus may be at least a part of a base station, and may include means for performing the method in the fourth aspect. In various embodiments, the apparatus may include means for receiving a RA request from another apparatus (e.g. at least a part of a UE) to perform a RA procedure, means for transmitting a RA response to the another apparatus, and means for determining whether the another apparatus has stopped an active time for monitoring a PDCCH before a successful PDCCH transmission addressed to a RNTI.

In various embodiments, the active time may be determined to have been stopped in response to an expiry of a DRX on duration timer before the successful PDCCH transmission addressed to the RNTI.

In various embodiments, the active time for monitoring the PDCCH may include the active time for monitoring the PDCCH addressed to at least one of a C-RNTI, a RA-RNTI, and a MSGB-RNTI in the active time.

In various embodiments, the RNTI may include at least one of C-RNTI, RA-RNTI, and MSGB-RNTI.

In a sixteenth aspect, a computer readable medium is disclosed. The computer readable medium may include program instructions for causing an apparatus to perform the method in the fourth aspect. For example, the apparatus may be at least a part of the apparatus in the fourteenth aspect and/or the fifteenth aspect. In various embodiment, the program instructions may be used for causing an apparatus to perform receiving a RA request from another apparatus (e.g. at least a part of a UE) to perform a RA procedure, transmitting a RA response to the another apparatus, and determining whether the another apparatus has stopped an active time for monitoring a PDCCH before a successful PDCCH transmission addressed to a RNTI.

In various embodiments, the active time may be determined to have been stopped in response to an expiry of a DRX on duration timer before the successful PDCCH transmission addressed to the RNTI.

In various embodiments, the active time for monitoring the PDCCH may include the active time for monitoring the PDCCH addressed to at least one of a C-RNTI, a RA-RNTI, and a MSGB-RNTI in the active time.

In various embodiments, the RNTI may include at least one of C-RNTI, RA-RNTI, and MSGB-RNTI.

BRIEF DESCRIPTION OF THE DRAWINGS

Some example embodiments will now be described, by way of non-limiting examples, with reference to the accompanying drawings.

DETAILED DESCRIPTION

When discontinuous reception (DRX) is configured, in Active Time, the UE or the MAC (Media Access Control) entity of the UE entity may monitor the PDCCH. For example, the Active Time may include the time while a DRX timer such as drx-onDurationTimer or drx-InactivityTimer or drx-RetransmissionTimerDL or drx-RetransmissionTimerUL or ra-ContentionResolutionTimer as described in the technical standards (TS) of 3rd Generation Partnership Project (3GPP) (e.g. 3GPP TS 38.321) is running, or a Scheduling Request is sent on physical uplink control channel (PUCCH) and is pending, or a PDCCH indicating a new transmission addressed to the Cell Radio Network Temporary Identifier (C-RNTI) of the MAC entity has not been received after successful reception of a RA Response for the RA Preamble not selected by the MAC entity among the contention-based RA Preamble.

However, for example, when being outside of the above example Active time, the UE performing RA procedure may become unable to monitor the PDCCH. For example, in a case where the DRX timers, such as a DRX inactivity timer (e.g. drx-InactivityTimer), a DRX HARQ RTT timer uplink (UL) (e.g. drx-HARQ-RTT-TimerUL), a DRX HARQ RTT timer downlink (DL) (e.g. drx-HARQ-RTT-TimerDL), a DRX retransmission timer UL (e.g. drx-RetransmissionTimerUL), or a DRX retransmission timer DL (e.g. drx-RetransmissionTimerDL), are not started when a UE performing a two-step RA procedure in CONNECTED mode is in DRX and receives a C-RNTI response for its MSGA (or message A carrying preamble and payload transmissions of the RA procedure for 2-step RA type) during MSGB (or message B as a response to MSGA in the 2-step RA procedure) response window, the base station may be unable to schedule a re-transmission grant for the UE or unable to provide a DL (re-)transmission, which may, for example, delay the BFR, UL/DL data transmissions or re-transmissions, and so on.

Figure 1:
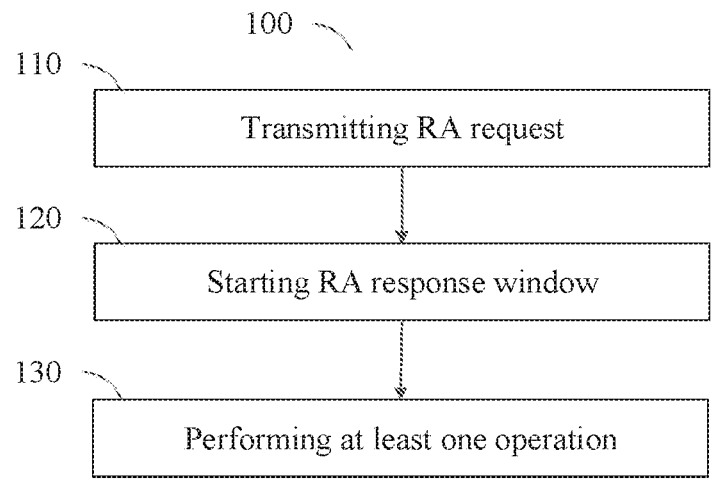
FIG. 1 illustrates an example method for a RA procedure in an embodiment.

FIG. 1 illustrates an example method 100 for a RA procedure in an example embodiment, which may be performed in an apparatus such as a UE or at least a part of the UE so as to enable the apparatus to monitor the PDCCH regardless of whether the apparatus is in Active Time when initiating the RA procedure.

As shown in FIG. 1, the example method 100 may include a step 110 of transmitting a RA request to another apparatus (e.g. at least a part of a base station) in the access network to perform a RA procedure, a step 120 of starting a RA response window in response to transmitting the RA request, and a step 130 of performing at least one operation.

In various embodiment, the at least one operation performed in the step 130 may be further performed in the method. In various embodiments, the at least one operation may include at least one of, for example, (1) considering or causing the apparatus to be in an active time while the RA response window is running, (2) starting at least one DRX timer in a case of receiving a PDCCH transmission addressed to a Radio Network Temporary identifier (RNTI) while the RA response window is running, (3) considering or causing the apparatus to be in an active time in response to a successful reception of a MSGB scheduled by MSGB-RNTI which includes fallbackRAR completing the RA procedure after transmitting a contention free MSGA, and so on.

In the example method 100, regardless of whether the apparatus is in active time, for example when monitoring PDCCH for example while the RA response window is running, the apparatus may be caused or considered or configured to enter or be in the active time according to various conditions, and/or at least one DRX timer is started in response to receiving a PDCCH transmission addressed to a RNTI while the RA response window is running. Thus, the apparatus may perform an expected RA procedure and may monitor the PDCCH for e.g. a re-transmission UL grant/DL assignment from the base station, so that, for example, delays of BFR, UL/DL data transmissions or re-transmissions, and so on may be mitigated or avoided. Further, the system efficiency may be improved for example by speeding up the BFR procedure, UL/DL data transmission, and so on. The monitoring of the PDCCH for e.g. a re-transmission UL grant/DL assignment from the base station, may be enabled by the apparatus entering in the active time according to various conditions, and/or by starting at least one DRX timer in response to receiving PDCCH transmission addressed to a RNTI.

The example method 100 is not limited to a specific RA procedure. For example, the RA procedure to be performed in the step 110 may be either a two-step RA procedure or a four-step RA procedure, and the RA procedure to be performed in the step 110 may be either a contention based RA procedure (e.g. a contention based RA with 2-step RA type or a contention based RA with 4-step RA type) or a contention free RA procedure (e.g. a contention free RA with 2-step RA type or a contention free RA with 4-step RA type).

In various embodiments, examples of the RA request transmitted in the step 110 may include, but be not limited to, a message carrying e.g. preamble and payload transmissions of the RA procedure for 2-step RA type, which is also called as a message A or MSGA, a contention based or contention free preamble of the RA procedure for 4-step RA type, a contention free preamble for BFR, and so on. In various embodiments, the RA request transmitted in the step 110 may be either a contention based RA request or a contention free RA request. For example, the RA request transmitted in the step 110 may be a contention based or a contention free MSGA. For example, the RA request transmitted in the step 110 may be a contention based or a contention free MSG1. For example, the RA request transmitted in the step 110 may be a contention based or a contention free preamble associated with the MSGA, in other words, the payload part of MSGA may not be transmitted.

In various embodiments, examples of the RA response window started in the step 120 may include, but be not limited to, a RA response window, e.g., ra-ResponseWindow, for a random access response (also called as a message 2 or MSG2) to a message for preamble transmission (also called as a message 1 or MSG1) in the 4-step RA procedure, and a RA response window for a random access response (also called as a message B or MSGB) to MSGA in the 2-step RA procedure, which may be also called as a message B response window or a MSGB response window or a msgB-ResponseWindow.

In various embodiments, the apparatus may be in a radio resource control connected (RRC_CONNECTED) mode.

In various embodiments, the apparatus may be configured with DRX cycle, so that the apparatus may monitor the PDCCH during at least the active time while a DRX timer such as drx-onDurationTimer or drx-InactivityTimer or drx-RetransmissionTimerDL or drx-RetransmissionTimerUL or ra-ContentionResolutionTimer for example as described in 3GPP TS 38.321 is running, or a Scheduling Request is sent on PUCCH and is pending, or a PDCCH indicating a new transmission addressed to the C-RNTI of the MAC entity has not been received after successful reception of a RA Response for the RA Preamble not selected by the MAC entity among the contention-based RA Preamble.

In various embodiments, regardless whether the apparatus is in active time, the apparatus may monitor PDCCH while the RA response window is running. For example, the example method 100 may further include causing the apparatus to monitor the PDCCH addressed to at least one of a C-RNTI, a RA-RNTI, a MSGB-RNTI, and so on while the RA response window is running. Then, in various embodiments, one or more operations may be performed in the step 130 for example in response to the monitoring.

Figure 2:
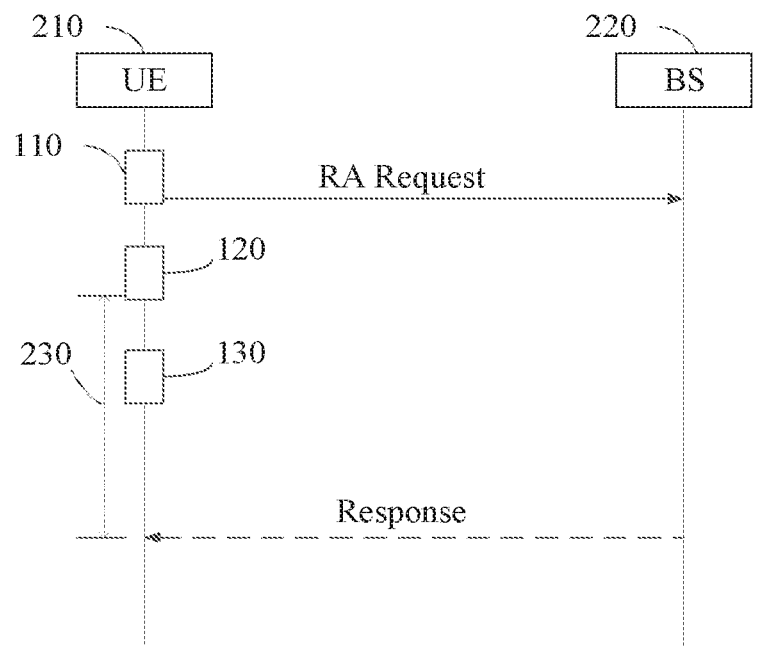
FIG. 2 illustrates an example of execution of the example method as shown in FIG. 1 in an embodiment.

For example, as shown in FIG. 2, the apparatus 210 (e.g. at least a part of UE) may transmit a RA request such as a MSGA in a 2-step RA procedure or a MSG1 in a 4-step RA procedure to another apparatus 220 (e.g. at least a part of base station or BS) in the step 110, and may start a RA response window 230 in the step 120 in response to transmitting the RA request in the step 110. It is appreciated that although a gap is shown between the steps 110 and 120 in FIG. 2, the step 120 may be followed after the step 110, for example, seamlessly. That is, for example, the RA response window 230 started in the step 120 may be a period less than or equal to the period defined by the end of the transmission of the RA request in the step 110 and the time of the reception of the response from the another apparatus 220. In one example, the RA response window may be started at the first PDCCH occasion from the end of the MSGA or a MSG1 transmission. Then, for example, the RA response window 230 may be considered as active time in the step 130. In another example, the RA response window 230 may be considered as active time in the step 130 for example in case where it is determined, by the apparatus 210, that it is to monitor PDCCH addressed to C-RNTI while the RA response window 230 is running.

Thus, the apparatus 210 may be enabled to monitor the PDCCH, regardless of whether the apparatus 210 is currently in the time while a DRX timer such as drx-onDurationTimer or drx-InactivityTimer or drx-RetransmissionTimerDL or drx-RetransmissionTimerUL or ra-ContentionResolutionTimer as described in e.g. 3GPP TS 38.321 is running, or a Scheduling Request is sent on PUCCH and is pending, or a PDCCH indicating a new transmission addressed to the C-RNTI of the MAC entity has not been received after successful reception of a RA Response for the RA Preamble not selected by the MAC entity among the contention-based RA Preamble.

Thus, the apparatus 210, for example configured with DRX cycle, may have a chance to start at least one DRX timer, such as drx-InactivityTimer or drx-Retransmission- TimerDL or drx-RetransmissionTimerUL or drx-HARQ-RTT-TimerUL or drx-HARQ-RTT-TimerDL when RA response is received so as to obtain a re-transmission grant and/or enable the another apparatus 220 to provide another UL or DL transmission. For example, the apparatus 210, may start at least one of the DRX timers if it receives a PDCCH transmission addressed to C-RNTI while the RA response window is running. For example, the PDCCH transmission addressed to C-RNTI may be regarded as RA response for the apparatus 210. Additionally or alternatively, in another example, the apparatus 210 may stop at least one DRX timer, such as drx-RetransmissionTimerDL or drx-RetransmissionTimerUL when RA response is received. In one example, drx-RetransmissionTimerDL or drx-RetransmissionTimerUL or drx-HARQ-RTT-TimerUL or drx-HARQ-RTT-TimerDL may be started or stopped for the corresponding HARQ process or on a per HARQ process.

Figure 3:
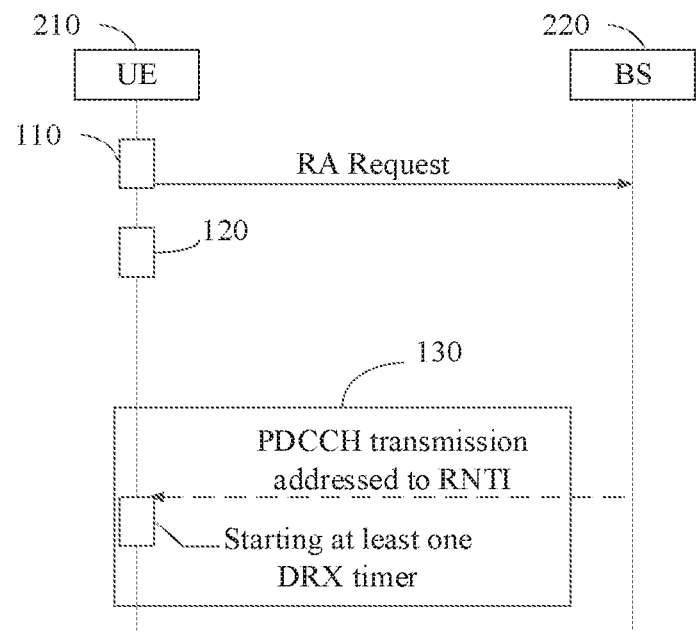
FIG. 3 illustrates another example of execution of the example method as shown in FIG. 1 in an embodiment.

In another example, as shown in FIG. 3, the apparatus 210 (e.g. at least a part of UE) may transmit a RA request such as MSGA in a 2-step RA procedure or a contention free RA preamble for a RA procedure, e.g., for BFR to another apparatus 220 (e.g. at least a part of base station or BS) in the step 110, and may start a RA response window 230 in the step 120 in response to transmitting the RA request in the step 110. For example, the RA response window 230 started in the step 120 may be a period less than or equal to the period defined by the end of the transmission of the RA request in the step 110 and the time of the reception of the response from the another apparatus 220. For example, the RA response window 230 started in the step 120 may be a period configured by the another apparatus 220 while the apparatus 210 monitors a RA response.

Then, when receiving a PDCCH transmission addressed to a RNTI while the RA response window is running, the apparatus 210 may start at least one DRX timer in the step 130, for example, when it is determined, by the apparatus 210, that it is to monitor PDCCH addressed to C-RNTI while the RA response window 230 is running. For example, the at least one DRX timer may be started by the apparatus 210 regardless of whether the apparatus 210 is in active time. In some examples, starting the at least one DRX timer may start active time whereas in some examples, starting the at least one DRX timer may not start active time. For instance, when receiving a PDCCH transmission addressed to a RNTI indicating a DL or UL transmission, drx-HARQ-RTT-TimerDL or drx-HARQ-RTT-TimerUL may be started, respectively, and the apparatus 210 may not enter active time. For instance, when receiving a PDCCH transmission addressed to a RNTI indicating a new transmission, drx-inactivityTimer may be started and the apparatus 210 may enter active time.

In various embodiments, the apparatus 210 may further monitor the PDCCH addressed to at least one of a C-RNTI, a RA-RNTI, a MSGB-RNTI, and so on, while the RA response window is running.

In various embodiments, the RNTI may include at least one of C-RNTI, RA-RNTI, MSGB-RNTI, and so on. In some examples the RNTI may also include at least one of Modulation and Coding Scheme C-RNTI (MCS-C-RNTI), Temporary C-RNTI (TC-RNTI), Power Saving RNTI (PS-RNTI), and so on. In one example, the RNTI may schedule a RA response for the apparatus 210.

In various embodiments, the at least one DRX timer may include at least one of a DRX inactivity timer, a DRX HARQ RTT timer uplink, a DRX HARQ RTT timer downlink, a DRX retransmission timer uplink, and a DRX retransmission timer downlink.

In one embodiment, the at least one DRX timer may be started whenever a PDCCH addressed to C-RNTI is received by the apparatus 210 regardless of whether the apparatus 210 is in active time or not.

Thus, at least one DRX timer may be started enabling the apparatus 210 to enter active time even the apparatus 210 is outside of the time while a DRX timer such as drx-onDurationTimer or drx-InactivityTimer or drx-RetransmissionTimerDL or drx-RetransmissionTimerUL or ra-ContentionResolutionTimer as described in e.g. 3GPP TS 38.321 is running, or a Scheduling Request is sent on PUCCH and is pending, or a PDCCH indicating a new transmission addressed to the C-RNTI of the MAC entity has not been received after successful reception of a RA Response for the RA Preamble not selected by the MAC entity among the contention-based RA Preamble, so that the apparatus 210 may have another chance to monitor the PDCCH.

Figure 4:
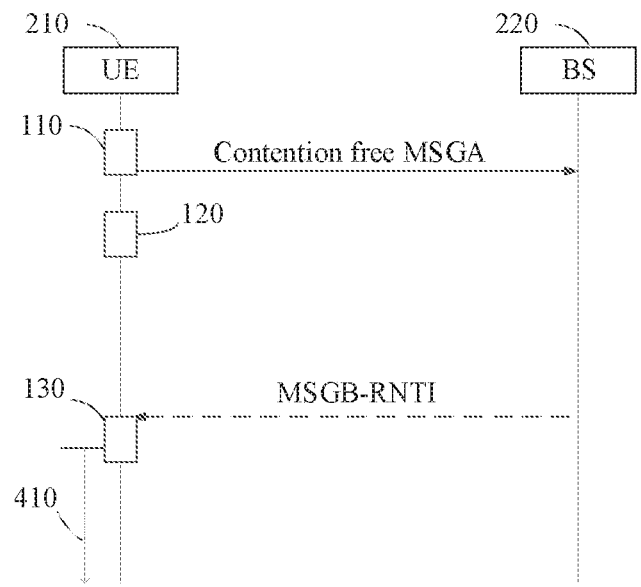
FIG. 4 illustrates yet another example of execution of the example method as shown in FIG. 1 in an embodiment.

In another example, as shown in FIG. 4, the apparatus 210 (e.g. at least a part of UE) may transmit a RA request such as a contention free MSGA to another apparatus 220 (e.g. at least a part of base station or BS) in the step 110, and may start a RA response window 230 in the step 120 in response to transmitting the RA request in the step 110. For example, the RA response window 230 started in the step 120 may be a period less than or equal to the period defined by the end of the transmission of the RA request in the step 110 and the time of the reception of the response from the another apparatus 220. For example, the RA response window 230 started in the step 120 may be a period configured by the another apparatus 220 while the apparatus 210 monitors a RA response.

Then, as shown in FIG. 4, in the step 130, the apparatus may be considered to enter an active time 410 in response to a successful reception of a fallback Random Access Response (fallbackRAR) scheduled by MSGB-RNTI for completing the RA procedure after transmitting a contention free MSGA. For example, the apparatus 210 may have transmitted a contention free MSGA consisting of preamble and payload (e.g., payload over Physical Uplink Shared Channel PUSCH) or consisting of preamble only. In another example, the another apparatus 220 may have only detected the preamble part of the MSGA transmitted by the apparatus 210 and may in response respond with a fallbackRAR scheduled by MSGB-RNTI to complete the RA procedure for the apparatus 210.

It is appreciated that the operations which may be performed in the step 130 are not limited to the above examples. In another example, in the step 130, the apparatus 210 may be considered to enter an active time in response to a determination that a contention free RA preamble for BFR was transmitted and a successful reception of a PDCCH transmission addressed to C-RNTI for completing the RA procedure is received.

Through the example method 100, for example, the definition of the active time may be expanded, and the apparatus such as a UE may be enabled another chances to monitor PDCCH regardless of whether the apparatus is in active time or whether the RA response window 230 is stopped/terminated after receiving the RA response. For example, through the example method 100, besides the active time while a DRX timer such as drx-onDurationTimer or drx-InactivityTimer or drx-RetransmissionTimerDL or drx-RetransmissionTimerUL or ra-ContentionResolutionTimer as described in e.g. 3GPP TS 38.321 is running, or a Scheduling Request is sent on PUCCH and is pending, or a PDCCH indicating a new transmission addressed to the C-RNTI of the MAC entity has not been received after successful reception of a RA Response for the RA Preamble not selected by the MAC entity among the contention-based RA Preamble, the apparatus may also support one or more additional active times such as an active time corresponding to the RA response window (such as ra-ResponseWindow or msgB-ResponseWindow), an active time after a successful reception of a fallback Random Access Response (fallback-RAR) scheduled by a MSGB-RNTI for completing the RA procedure after transmitting a contention free MSGA, an active time by starting at least one DRX timer in response to receiving RA response, and so on. Thus, for example, delays of BFR, UL/DL data transmissions or re-transmissions, and so on, may be mitigated or avoided so that the system efficiency may be improved for example by speeding up the BFR procedure, UL data transmission, and so on.

As described above, the active time may include the time while a PDCCH indicating a new transmission addressed to the C-RNTI of the MAC entity has not been received after successful reception of a RA Response for the RA Preamble not selected by the MAC entity among the contention-based RA Preamble. That is, the apparatus such as a UE may keep monitoring PDCCH after a successful RA response reception until another PDCCH for a new transmission is received. However, for example, there might not be anything to be scheduled when BFR happens.

Figure 5:
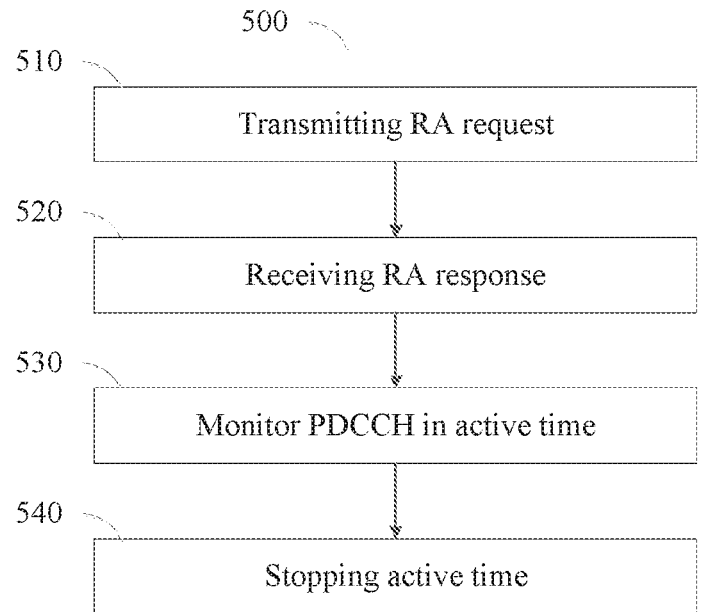
FIG. 5 an example method for a RA procedure in an embodiment.

FIG. 5 illustrates another example method 500 for a RA procedure in an example embodiment, which may be performed in an apparatus such as a UE or at least a part of the UE.

As shown in FIG. 5, the example method 500 may include a step 510 of transmitting a RA request to another apparatus (e.g. at least a part of a base station) to perform a RA procedure, a step 520 of receiving a RA response from the another apparatus, a step 530 of monitoring a PDCCH in an active time, and a step 540 of stopping the active time before receiving a PDCCH transmission addressed to a RNTI.

For example, in the example method 500, the apparatus may be in DRX, and may stop the active time after receiving a first PDCCH transmission addressed to RNTI and before receiving a second PDCCH transmission addressed to RNTI, in response one or more predetermined conditions.

Figure 6:
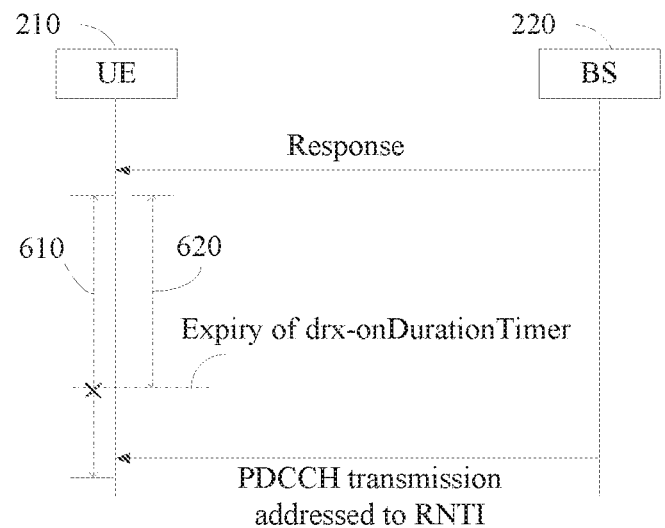
FIG. 6 illustrates an example of execution of the example method as shown in FIG. 5 in an embodiment.

For example, the DRX on duration timer may be started when the apparatus enter into an active time. Then, for example as shown in FIG. 6, in the step 540, the active time 610 may be stopped in response to an expiry of a DRX on duration timer (e.g. drx-onDurationTimer) before receiving the PDCCH transmission addressed to the RNTI. Thus, the actual active time becomes the part 620 as shown in FIG. 6 which is shorter than the original active time 610. In an embodiment, the drx-onDurationTimer may be restarted under some predetermined conditions.

In the example method 500, during an active time for monitoring PDCCH, the apparatus may stop the active time ahead of time before receiving a PDCCH transmission addressed to a RNTI in the step 540, so that the apparatus may be stopped from continuously monitoring the PDCCH in a case where there might not be anything to be scheduled, for example when BFR happens. Thus, for example, the apparatus may be enabled to sleep to save power.

It is appreciated that the active time may be stopped according to other conditions, which are not limited to the above examples. For example, the apparatus 210 may also stop the active time for example if it is determined that the BFR procedure is complete from lower layer (e.g. Layer 1), and the like. Thus, for example, the apparatus may be enabled to sleep to save power.

Further, various features and aspects of the example method 100 may be also included in or combined with or applied to the example method 500. For example, the monitoring the PDCCH in the active time may include monitoring the PDCCH addressed to at least one of a C-RNTI, a RA-RNTI, and a MSGB-RNTI in the active time. For example, the RNTI may include at least one of C-RNTI, RA-RNTI, and MSGB-RNTI. For example, the RA procedure may include a two-step RA procedure or a four-step RA procedure.

For example, the step 510 of the example method 500 may be the same as the step 110 of the example method 100, and the steps 520, 530 and 540 of the example method 500 may be also included in the example method 100, or the steps of the example method 100 may be also included in the example method 500.

Figure 7:
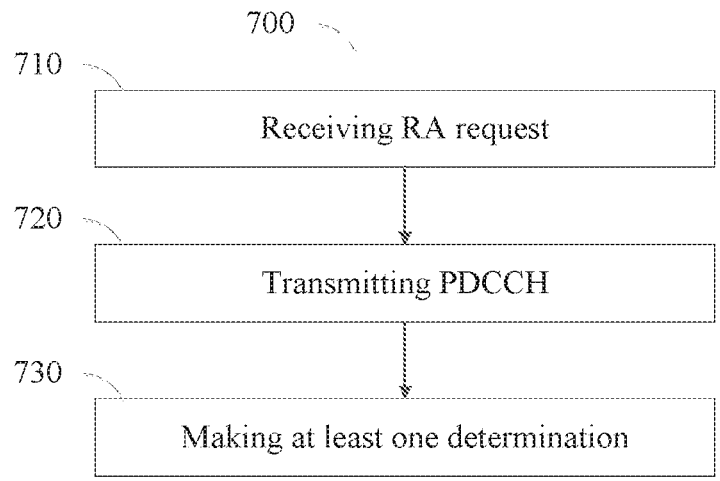
FIG. 7 an example method for a RA procedure in an embodiment.

FIG. 7 illustrates an example method 700 for a RA procedure in an embodiment, which may be performed in an apparatus such as at least a part of base station, for example to cooperate with another apparatus performing the example method 100.

As shown in FIG. 7, the example method 700 may include a step 710 of receiving a RA request from another apparatus (e.g. at least a part of a UE) to perform a RA procedure, a step 720 of transmitting a PDCCH, and a step 730 of making at least one determination of, for example, (1) whether the another apparatus is in an active time according to whether a RA response window for the RA procedure is running, (2) whether at least one DRX timer in the another apparatus has been started based on a successful transmission of the PDCCH addressed to a RNTI while the RA response window is running, (3) whether the another apparatus is in an active time according to a successful transmission of a MSGB scheduled by a MSGB-RNTI for completing the RA procedure after receiving a contention free MSGA, and so on.

The example method 700 may be performed for example to cooperate with another apparatus performing the example method 100. Thus, various features and aspects of the example method 100 may also be applied to or included in or combined with the example method 700.

For example, in various embodiments, the RA request may include a message A or a contention free preamble for BFR.

In various embodiments, the RA request may be a contention based RA request or a contention free RA request.

In various embodiments, the RA procedure may include a two-step RA procedure or a four-step RA procedure.

In various embodiments, the at least one DRX timer may include at least one of a DRX inactivity timer, a DRX HARQ RTT timer uplink, a DRX HARQ RTT timer downlink, a DRX retransmission timer uplink, and a DRX retransmission timer downlink.

In various embodiments, the method may further include determining that the another apparatus enters DRX in response to an expiry of the RA response window.

In various embodiments, the transmitting the PDCCH may include transmitting the PDCCH addressed to at least one of a C-RNTI, a RA-RNTI, and a MSGB-RNTI while the RA response window is running. In various embodiments, the RNTI may include at least one of C-RNTI, RA-RNTI, and MSGB-RNTI.

Figure 8:
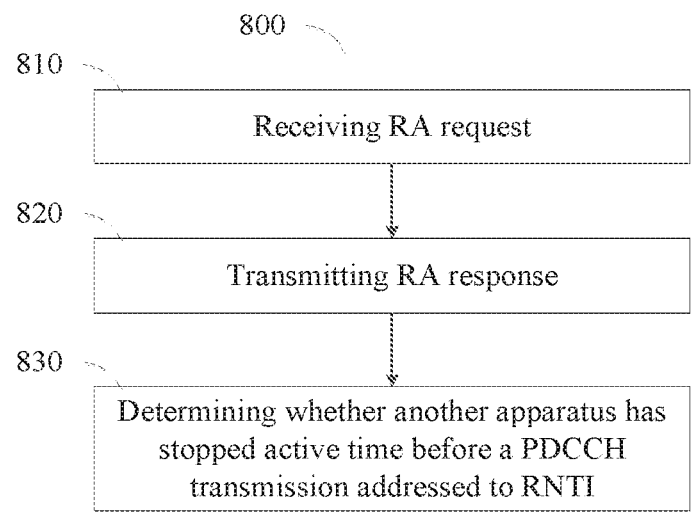
FIG. 8 an example method for a RA procedure in an embodiment.

FIG. 8 illustrates an example method 800 for a RA procedure in an embodiment, which may be performed in an apparatus such as at least a part of base station, for example to cooperate with another apparatus performing the example method 500.

As shown in FIG. 8, the example method 800 may include a step 810 of receiving a RA request from another apparatus (e.g. at least a part of a UE) to perform a RA procedure, a step 820 of transmitting a RA response to the another apparatus, and a step 830 of determining whether the another apparatus has stopped an active time for monitoring a PDCCH before a successful PDCCH transmission addressed to a RNTI.

The example method 800 may be performed for example to cooperate with another apparatus performing the example method 500. Thus, various features and aspects of the example method 500 may also be applied to or included in or combined with the example method 800.

For example, in various embodiments, the active time may be determined to have been stopped in response to an expiry of a DRX on duration timer before the successful PDCCH transmission addressed to the RNTI. In various embodiments, the active time for monitoring the PDCCH may include the active time for monitoring the PDCCH addressed to at least one of a C-RNTI, a RA-RNTI, and a MSGB-RNTI in the active time. In various embodiments, the RNTI may include at least one of C-RNTI, RA-RNTI, and MSGB-RNTI.

Further, similar to the example methods 100 and 500, the example methods 700 and 800 may be combined together.

Figure 9:
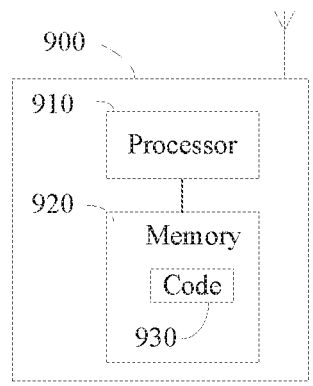
FIG. 9 illustrates an example apparatus for a RA procedure in an embodiment.

FIG. 9 illustrates an example apparatus 900 for a RA procedure in an embodiment, which, for example, may be at least a part of a UE, e.g. the UE 210 in the above examples.

As shown in FIG. 9, the example apparatus 900 may include at least one processor 910 and at least one memory 920 that may include computer program code 930. The at least one memory 920 and the computer program code 930 may be configured to, with the at least one processor 910, cause the apparatus 900 at least to perform at least one of the example method 100 and the example 500 described above.

In various example embodiments, the at least one processor 910 in the example apparatus 900 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 910 may also include at least one other circuitry or element not shown in FIG. 9.

In various example embodiments, the at least one memory 920 in the example apparatus 900 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 920 may include, but are not limited to, an electric, a magnetic, an optical, an electromagnetic, an infrared, or a semiconductor system, apparatus, or device or any combination of the above.

Further, in various example embodiments, the example apparatus 900 may also include at least one other circuitry, element, and interface, for example at least one I/O interface, at least one antenna element, and the like.

In various example embodiments, the circuitries, parts, elements, and interfaces in the example apparatus 900, including the at least one processor 910 and the at least one memory 920, may be coupled together via any suitable connections including, but not limited to, buses, crossbars, wiring and/or wireless lines, in any suitable ways, for example electrically, magnetically, optically, electromagnetically, and the like.

It is appreciated that the structure of the apparatus on the side of the UE is not limited to the above example apparatus 900.

Figure 10:
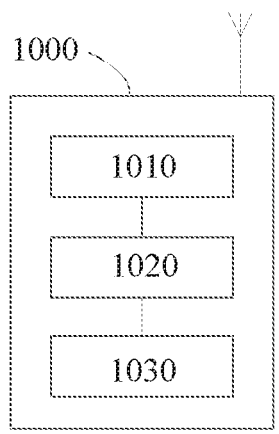
FIG. 10 illustrates an example apparatus for a RA procedure in an embodiment.

FIG. 10 illustrates another example apparatus 1000 for a RA procedure in an embodiment, which, for example, may be at least a part of the UE, e.g. the UE 210 in above examples, may be configured to perform the example method 100.

As shown in FIG. 10, the example apparatus 1000 may include means 1010 for performing the step 110 of the example method 100, means 1020 for performing the step 120 of the example method 100, and means 1030 for performing the step 130 of the example method 100. In one or more another example embodiments, at least one I/O interface, at least one antenna element, and the like may also be included in the example apparatus 1000. For example, the example apparatus 1000 may also include means for determining to monitor the PDCCH addressed to at least one of a C-RNTI, a RA-RNTI, an MSGB-RNTI, a TC-RNTI, an MCS-C-RNTI, a PS-RNTI, and so on, while the RA response window is running.

In some example embodiments, examples of means in the example apparatus 1100 may include circuitries. For example, an example of means 1010 may include a circuitry configured to perform the step 110 of the example method 100, an example of means 1020 may include a circuitry configured to perform the step 120 of the example method 100, and an example of means 1030 may include a circuitry configured to perform the step 130 of the example method 100. In some example embodiments, examples of means may also include software modules and any other suitable function entities.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Figure 11:
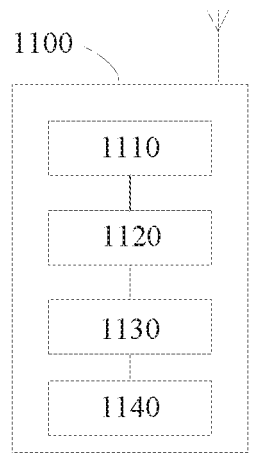
FIG. 11 illustrates an example apparatus for a RA procedure in an embodiment.

FIG. 11 illustrates another example apparatus 1100 for a RA procedure in an embodiment, which, for example, may be at least a part of the UE, e.g. the UE 210 in above examples, may be configured to perform the example method 500.

As shown in FIG. 11, the example apparatus 1100 may include means 1110 for performing the step 510 of the example method 500, means 1120 for performing the step 520 of the example method 500, means 1130 for performing the step 530 of the example method 500, and means 1140 for performing the step 540 of the example method 500. In one or more another example embodiments, at least one I/O interface, at least one antenna element, and the like may also be included in the example apparatus 1100.

In some example embodiments, examples of means in the example apparatus 1100 may include circuitries. For example, an example of means 1110 may include a circuitry configured to perform the step 510 of the example method 500, an example of means 1120 may include a circuitry configured to perform the step 520 of the example method 500, an example of means 1130 may include a circuitry configured to perform the step 530 of the example method 500, and an example of means 1140 may include a circuitry configured to perform the step 540 of the example method 500. In some example embodiments, examples of means may also include software modules and any other suitable function entities.

Figure 12:
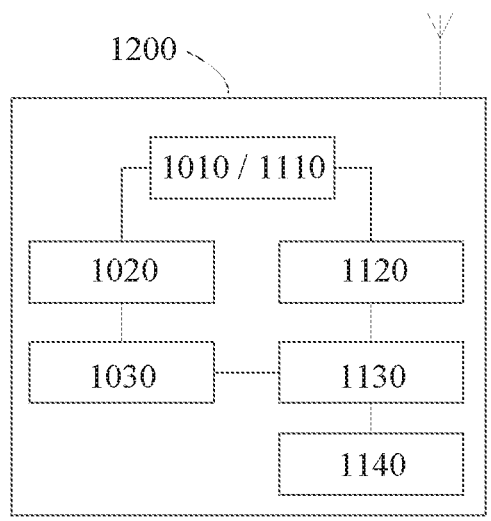
FIG. 12 illustrates an example apparatus for a RA procedure in an embodiment.

FIG. 12 illustrates another example apparatus 1200 for a RA procedure in an embodiment, which, for example, may be at least a part of the UE, e.g. the UE 210 in above examples, may be configured to perform both the example methods 100 and 500.

As shown in FIG. 12, the example apparatus 1200 may include the means in both the example apparatuses 1000 and 1100, wherein one of the means 1110 in the example apparatus 1100 and the means 1110 in the example apparatus 1100 may be included in the example apparatus 1200, and for example, the means 1130 may be initiated to monitor PDCCH in active time according to the at least one determination from the means 1030.

In another embodiment, the example apparatus 900 may be combined with at least one of the example apparatuses 1000 and 1100.

Figure 13:
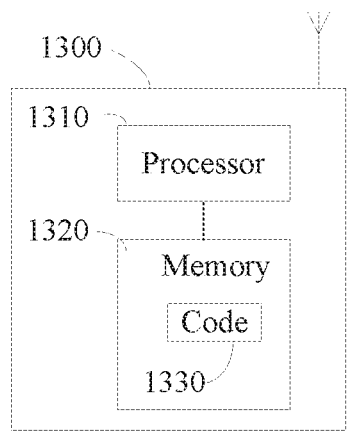
FIG. 13 illustrates an example apparatus for a RA procedure in an embodiment.

FIG. 13 illustrates an example apparatus 1300 which, for example, may be at least a part of a base station, e.g. the base station 220 in the above examples.

As shown in FIG. 13, the example apparatus 1300 may include at least one processor 1310 and at least one memory 1320 that may include computer program code 1330. The at least one memory 1320 and the computer program code 1330 may be configured to, with the at least one processor 1310, cause the apparatus 1300 at least to perform at least one of the example method 700 and the example 800 described above.

In various example embodiments, the at least one processor 1310 in the example apparatus 1300 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 1310 may also include at least one other circuitry or element not shown in FIG. 13.

In various example embodiments, the at least one memory 1320 in the example apparatus 1300 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 1320 may include, but are not limited to, an electric, a magnetic, an optical, an electromagnetic, an infrared, or a semiconductor system, apparatus, or device or any combination of the above.

Further, in various example embodiments, the example apparatus 1300 may also include at least one other circuitry, element, and interface, for example at least one I/O interface, at least one antenna element, and the like.

In various example embodiments, the circuitries, parts, elements, and interfaces in the example apparatus 1300, including the at least one processor 1310 and the at least one memory 1320, may be coupled together via any suitable connections including, but not limited to, buses, crossbars, wiring and/or wireless lines, in any suitable ways, for example electrically, magnetically, optically, electromagnetically, and the like.

It is appreciated that the structure of the apparatus on the side of the base station is not limited to the above example apparatus 1300.

Figure 14:
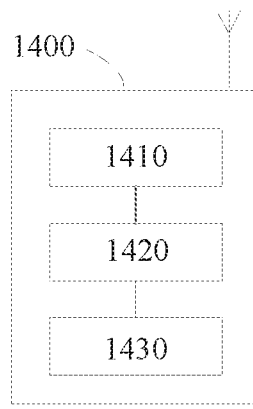
FIG. 14 illustrates an example apparatus for a RA procedure in an embodiment.

FIG. 14 illustrates another example apparatus 1400 for a RA procedure in an embodiment, which, for example, may be at least a part of the base station, e.g. the base station 220 in the above examples, may be configured to perform the example method 700.

As shown in FIG. 14, the example apparatus 1400 may include means 1410 for performing the step 710 of the example method 700, means 1420 for performing the step 720 of the example method 700, and means 1430 for performing the step 730 of the example method 700. In one or more another example embodiments, at least one I/O interface, at least one antenna element, and the like may also be included in the example apparatus 1400.

In some example embodiments, examples of means in the example apparatus 1400 may include circuitries. For example, an example of means 1410 may include a circuitry configured to perform the step 710 of the example method 700, an example of means 1420 may include a circuitry configured to perform the step 720 of the example method 700, and an example of means 1430 may include a circuitry configured to perform the step 730 of the example method 700. In some example embodiments, examples of means may also include software modules and any other suitable function entities.

Figure 15:
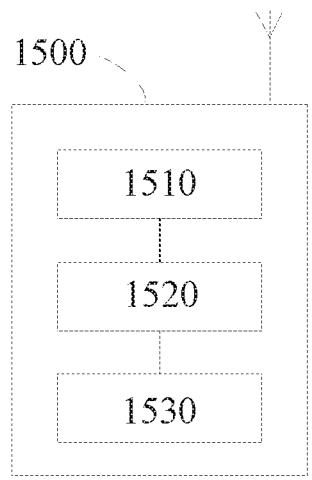
FIG. 15 illustrates an example apparatus for a RA procedure in an embodiment.

FIG. 15 illustrates another example apparatus 1500 for a RA procedure in an embodiment, which, for example, may be at least a part of the base station, e.g. the base station 220 in the above examples, may be configured to perform the example method 800.

As shown in FIG. 15, the example apparatus 1500 may include means 1510 for performing the step 810 of the example method 800, means 1520 for performing the step 820 of the example method 800, and means 1530 for performing the step 830 of the example method 800. In one or more another example embodiments, at least one I/O interface, at least one antenna element, and the like may also be included in the example apparatus 1500.

In some example embodiments, examples of means in the example apparatus 1500 may include circuitries. For example, an example of means 1510 may include a circuitry configured to perform the step 810 of the example method 800, an example of means 1520 may include a circuitry configured to perform the step 820 of the example method 800, and an example of means 1530 may include a circuitry configured to perform the step 830 of the example method 800. In some example embodiments, examples of means may also include software modules and any other suitable function entities.

In another embodiment, two or more of the example apparatuses 1300, 1400, and 1500 may be combined into an apparatuses configured to perform at least one of the example methods 700 and 800.

Another example embodiment may be related to a computer readable medium having such computer program codes or instructions stored thereon. In various example embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While some example embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. An apparatus comprising:
   at least one processor; and
   at least one non-transitory memory storing instructions that, when executed by the at least one processor, cause the apparatus to:
   transmit a random access request to another apparatus during a two-step random access procedure, the random access request comprising a message a;
   start a message b response window for the two-step random access procedure, in response to transmitting the random access request comprising the message a;
   monitor, with a media access control entity of the apparatus, a physical downlink control channel for a random access response identified with a cell radio network temporary identifier, while the message b response window is running, in response to the random access request comprising the message a having included the cell radio network temporary identifier;
   monitor, with the media access control entity of the apparatus, the physical downlink control channel for the random access response identified with a message b radio network temporary identifier, while the message b response window is running;
   wherein the message b radio network temporary identifier is different from a random access radio network temporary identifier and the cell radio network temporary identifier;
   wherein the random access response comprises a message b response, in response to the message a;
   wherein the apparatus is in an active time to monitor the physical downlink control channel while the message b response window is running;
   start, with the media access control entity of the apparatus, at least one discontinuous reception timer in a case of receiving a physical downlink control channel transmission addressed to the cell radio network temporary identifier while the message b response window is running; and
   start, with the media access control entity of the apparatus, the at least one discontinuous reception timer in a case of receiving the physical downlink control channel transmission addressed to the message b radio network temporary identifier while the message b response window is running.

2. The apparatus of claim 1, wherein the random access (RA) request comprises a contention based preamble, and the RA request is a contention based RA request.

3. The apparatus of claim 1, wherein the instructions, when executed by the at least one processor, cause the apparatus to:
   include, within the random access request, the cell radio network temporary identifier.

4. The apparatus of claim 1, wherein the apparatus is in a radio resource control connected mode.

5. The apparatus of claim 1, wherein the media access control (MAC) entity of the apparatus is further configured to:
   stop a discontinuous reception (DRX) retransmission timer downlink (DL) for a corresponding hybrid automatic repeat request (HARQ) process, in response to the physical downlink control channel (PDCCH) transmission indicating a DL transmission;

stop a DRX retransmission timer uplink (UL) for the corresponding HARQ process, in response to the PDCCH transmission indicating a UL transmission.

6. The apparatus of claim 1, wherein the at least one discontinuous reception (DRX) timer comprises at least one of a DRX inactivity timer, a DRX hybrid automatic repeat request (HARQ) round trip time (RTT) timer uplink, a DRX HARQ RTT timer downlink, a DRX retransmission timer uplink, or a DRX retransmission timer downlink.

7. The apparatus of claim 1, wherein the apparatus is configured with discontinuous reception (DRX) cycle.

8. The apparatus of claim 1, wherein the at least one memory and the computer program code are further configured to, with the at least one processor, cause the apparatus to:
  enter discontinuous reception (DRX) in response to an expiry of the message b response window.

9. The apparatus of claim 1, wherein the instructions, when executed by the at least one processor, cause the apparatus to:
  monitor the physical downlink control channel (PDCCH) addressed to the random access radio network temporary identifier (RA-RNTI) while the message b response window is running.

10. The apparatus of claim 1, wherein the media access control (MAC) entity of the apparatus is further configured to:
  start a discontinuous reception (DRX) hybrid automatic repeat request (HARQ) round trip time (RTT) timer downlink (DL), in response to the physical downlink control channel (PDCCH) transmission indicating a DL transmission;
  start a DRX HARQ RTT timer uplink (UL), in response to the PDCCH transmission indicating a UL transmission; and
  start a DRX inactivity timer, in response to the PDCCH transmission indicating a DL or UL transmission.

11. An apparatus comprising:
  at least one processor; and
  at least one non-transitory memory storing instructions that, when executed by the at least one processor, cause the apparatus to:
  receive a random access request from another apparatus during a two-step random access procedure, the random access request comprising a message a;
  transmit a physical downlink control channel with a random access response identified with a cell radio network temporary identifier, while a message b response window is running, in response to the random access request comprising the message a having included the cell radio network temporary identifier;
  transmit the physical downlink control channel with the random access response identified with a message b radio network temporary identifier, while the message b response window is running;
  wherein the message b radio network temporary identifier is different from a random access radio network temporary identifier and the cell radio network temporary identifier;
  wherein the random access response comprises a message b response, in response to the message a;
  determine whether the another apparatus is in an active time to monitor the physical downlink control channel based on whether the message b response window for the two-step random access procedure is running;
  determine whether at least one discontinuous reception timer in the another apparatus has been started with a media access control entity of the another apparatus based on a successful transmission of the physical downlink control channel addressed to the cell radio network temporary identifier while the message b response window is running; and
  determine whether the at least one discontinuous reception timer in the another apparatus has been started with the media access control entity of the another apparatus based on a successful transmission of the physical downlink control channel addressed to the message b radio network temporary identifier while the message b response window is running.

12. The apparatus of claim 11, wherein the random access (RA) request comprises a contention based preamble for beam failure recovery, and the RA request is a contention based RA request.

13. The apparatus of claim 11, wherein the at least one discontinuous reception (DRX) timer comprises at least one of a DRX inactivity timer, a DRX hybrid automatic repeat request (HARQ) round trip time (RTT) timer uplink, a DRX HARQ RTT timer downlink, a DRX retransmission timer uplink, or a DRX retransmission timer downlink.

14. The apparatus of claim 11, wherein the transmitting the physical downlink control channel (PDCCH) comprises:
  transmitting the PDCCH addressed to the random access radio network temporary identifier (RA-RNTI) while the message b response window is running.

15. The apparatus of claim 11, wherein the random access request comprising the message includes the cell radio network temporary identifier (C-RNTI).

16. A method comprising:
  transmitting, at an apparatus, a random access request to another apparatus during a two-step random access procedure, the random access request comprising a message a;
  starting, at the apparatus, a message b response window for the two-step random access procedure, in response to transmitting the random access request comprising the message a;
  monitoring, with a media access control entity of the apparatus, a physical downlink control channel for a random access response identified with a cell radio network temporary identifier, while the message b response window is running, in response to the random access request comprising the message a having included the cell radio network temporary identifier;
  monitoring, with the media access control entity of the apparatus, the physical downlink control channel for the random access response identified with a message b radio network temporary identifier, while the message b response window is running;
  wherein the message b radio network temporary identifier is different from a random access radio network temporary identifier and the cell radio network temporary identifier;
  wherein the random access response comprises a message b response, in response to the message a;
  wherein the apparatus is in an active time to monitor the physical downlink control channel while the message b response window is running;
  starting, with the media access control entity of the apparatus, at least one discontinuous reception timer in a case of receiving a physical downlink control channel transmission addressed to the cell radio network temporary identifier while the message b response window is running; and starting, with the media access control entity of the apparatus, the at least one discontinuous reception timer in a case of receiving the physical downlink control channel transmission addressed to the message b radio network temporary identifier while the message b response window is running.

17. The method of claim 16, wherein the active time is entered upon at least one of:
the starting of the at least one discontinuous reception timer during the message b (msgB) response window, wherein the active time stops upon expiry of the at least one discontinuous reception timer;
receipt of the physical downlink control channel transmission addressed to the radio network temporary identifier during the msgB response window, or
reception of a fallback random access response scheduled with a radio network temporary identifier message for completing the two-step random access procedure after transmitting the random access request.

18. The method of claim 16, wherein the apparatus is configured with discontinuous reception (DRX) cycle.

19. The method of claim 16, wherein the message b response window for the two-step random access procedure is started with the media access control (MAC) entity of the apparatus.

20. The method of claim 16, further comprising including, within the random access request, the cell radio network temporary identifier (C-RNTI).

21. The apparatus of claim 1, wherein the random access (RA) request comprises a contention free preamble, and the RA request is a contention free RA request.

22. The apparatus of claim 11, wherein the random access (RA) request comprises a contention free preamble for beam failure recovery, and the RA request is a contention free RA request.

23. The apparatus of claim 1, wherein the message b response window is started at a physical downlink control channel occasion in a time period that is less than or substantially equal to a time period comprising an end of the transmission of the random access request comprising the message a.

24. The apparatus of claim 23, wherein the physical downlink control channel occasion at which the message h response window is started comprises a first physical downlink control channel occasion from the end of the transmission of the random access request comprising the message a.

25. The apparatus of claim 1, wherein the instructions, when executed by the at least one processor, cause the apparatus at least to:
enter the active time upon the starting of the at least one discontinuous reception timer during the message b response window.

26. The apparatus of claim 1, wherein the instructions, when executed by the at least one processor, cause the apparatus at least to:
stop the active time upon expiry of the at least one discontinuous reception timer.

27. The apparatus of claim 1, wherein the instructions, when executed by the at least one processor, cause the apparatus at least to:
enter the active time upon reception of a fallback random access response scheduled with a radio network temporary identifier message for completing the two-step random access procedure after transmitting the random access request.

* * * * *